(12) United States Patent
Radovic et al.

(10) Patent No.: US 9,722,448 B2
(45) Date of Patent: Aug. 1, 2017

(54) PROTECTION DEVICE AND METHOD FOR POWER TRANSMITTER

(71) Applicant: QUALCOMM Incorporated, San Diego, CA (US)

(72) Inventors: Milorad Radovic, San Diego, CA (US); Gabriel Isaac Mayo, North Potomac, MD (US)

(73) Assignee: QUALCOMM Incorporated, San Diego, CA (US)

( * ) Notice: Subject to any disclaimer, the term of this patent is extended or adjusted under 35 U.S.C. 154(b) by 798 days.

(21) Appl. No.: 14/108,235

(22) Filed: Dec. 16, 2013

(65) Prior Publication Data

US 2014/0103869 A1   Apr. 17, 2014

Related U.S. Application Data

(63) Continuation-in-part of application No. 13/837,638, filed on Mar. 15, 2013, now Pat. No. 9,391,442.

(60) Provisional application No. 61/698,548, filed on Sep. 7, 2012.

(51) Int. Cl.
| | |
|---|---|
| *H02J 5/00* | (2016.01) |
| *H02J 50/10* | (2016.01) |
| *H02J 7/02* | (2016.01) |
| *H04B 5/00* | (2006.01) |

(52) U.S. Cl.
CPC ............. *H02J 7/025* (2013.01); *H02J 5/005* (2013.01); *H04B 5/0037* (2013.01); *H04B 5/0075* (2013.01); *H04B 5/0093* (2013.01)

(58) Field of Classification Search
CPC .......... H02J 7/025; H02J 5/005; H04B 5/0037
See application file for complete search history.

(56) References Cited

U.S. PATENT DOCUMENTS

| | | | |
|---|---|---|---|
| 9,391,442 B2 | 7/2016 | Tseng et al. | |
| 2005/0235169 A1 | 10/2005 | Lou | |
| 2008/0197711 A1 | 8/2008 | Kato et al. | |
| 2009/0174264 A1 | 7/2009 | Onishi et al. | |

(Continued)

FOREIGN PATENT DOCUMENTS

| | | |
|---|---|---|
| CN | 101438480 A | 5/2009 |
| CN | 101447683 A | 6/2009 |

(Continued)

OTHER PUBLICATIONS

STIC Search Report.*

*Primary Examiner* — Jared Fureman
*Assistant Examiner* — James Evans

(57) ABSTRACT

Aspects of a protection circuit and method are disclosed. An apparatus to transmit wireless power comprises a transmit antenna, a driver, a sensing circuit, and a control circuit. The transmit antenna generates a wireless field to charge devices. The driver powers the transmit antenna for generation of the wireless field. A power level of the wireless field is based on a power level of the driver. The sensing circuit senses wireless power received at the transmit antenna and generates a monitoring signal based on the sensed wireless power received at the transmit antenna. The control circuit controls the power level or inhibits the driver from powering the transmit antenna when the monitoring signal indicates that the transmit antenna is receiving wireless power from a foreign antenna.

17 Claims, 10 Drawing Sheets

(56) References Cited

U.S. PATENT DOCUMENTS

| | | |
|---|---|---|
| 2009/0284082 A1 | 11/2009 | Mohammadian |
| 2010/0022209 A1 | 1/2010 | Ng et al. |
| 2010/0237709 A1 | 9/2010 | Hall et al. |
| 2010/0328044 A1* | 12/2010 | Waffenschmidt ....... H02J 7/025 340/10.4 |
| 2011/0106210 A1 | 5/2011 | Meskens |
| 2011/0287714 A1* | 11/2011 | Wilson ................. H04B 5/0075 455/41.1 |
| 2011/0292554 A1 | 12/2011 | Yao et al. |
| 2012/0049644 A1 | 3/2012 | Choi et al. |
| 2012/0064826 A1 | 3/2012 | Darwhekar et al. |
| 2012/0149307 A1 | 6/2012 | Terada et al. |
| 2012/0231731 A1 | 9/2012 | Kim et al. |
| 2012/0235636 A1 | 9/2012 | Partovi |
| 2012/0242163 A1* | 9/2012 | Jung ....................... H02J 7/025 307/104 |
| 2012/0262002 A1 | 10/2012 | Widmer et al. |

FOREIGN PATENT DOCUMENTS

| | | |
|---|---|---|
| EP | 2388930 A2 | 11/2011 |
| WO | WO-2010062201 A1 | 6/2010 |
| WO | WO-2012169584 A1 | 12/2012 |

\* cited by examiner

PROTECTION DEVICE AND METHOD FOR POWER TRANSMITTER

CROSS-REFERENCE TO RELATED APPLICATIONS

This application is a continuation-in-part of application Ser. No. 13/837,638, titled "PROTECTION DEVICE AND METHOD FOR POWER TRANSMITTER," filed Mar. 15, 2013, which claims the priority benefit of U.S. Provisional Application No. 61/698,548, titled "PROTECTION DEVICE AND METHOD FOR POWER TRANSMITTER," filed Sep. 7, 2012, the disclosures of which are incorporated herein by reference.

FIELD

The present invention relates generally to wireless power. More specifically, the disclosure is directed to transmitter-to-transmitter protection.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus to transmit wireless power. The apparatus comprises a transmit antenna configured to generate a wireless field at a power level sufficient to charge one or more electronic devices. A driver configured to power the transmit antenna for generation of the wireless field. The power level of the wireless field is based at least on a power level of the driver. The apparatus further comprises a sensing circuit configured to sense, at one or more nodes, wireless power received at the transmit antenna and further configured to generate a monitoring signal based at least on the sensed wireless power received at the transmit antenna. The apparatus further comprises a control circuit configured to modify the power level of the driver based at least on the monitoring signal.

Another aspect of the disclosure provides a method of protecting a wireless power transmitter. The method comprises sensing at one or more nodes of the wireless power transmitter for wireless power received at a transmit antenna of the wireless power transmitter. The transmit antenna is configured to generate a wireless field at a power level sufficient to charge one or more electronic devices. The wireless power transmitter further includes a driver configured to power the transmit antenna for generation of the wireless field. The power level of the wireless field is based at least on a power level of the driver. The method further comprises generating a monitoring signal based at least on the sensed wireless power received at the transmit antenna. The method further comprises modifying the power level of the driver based at least on the monitoring signal.

Another aspect of the disclosure provides an apparatus for protecting a wireless power transmitter. The apparatus comprises means for generating a wireless field at a power level sufficient to charge one or more electronic devices. The apparatus further comprises means for powering the wireless field generating means to generate the wireless field. The power level of the wireless field can be based at least on a power level of the powering means. The apparatus further comprises means for sensing wireless power received at the wireless field generating means. The sensing means is configured to generate a monitoring signal based at least on the sensed wireless power received at the wireless field generating means. The apparatus further comprises means for modifying the power level of the powering means based at least on the monitoring signal.

Figure 1:
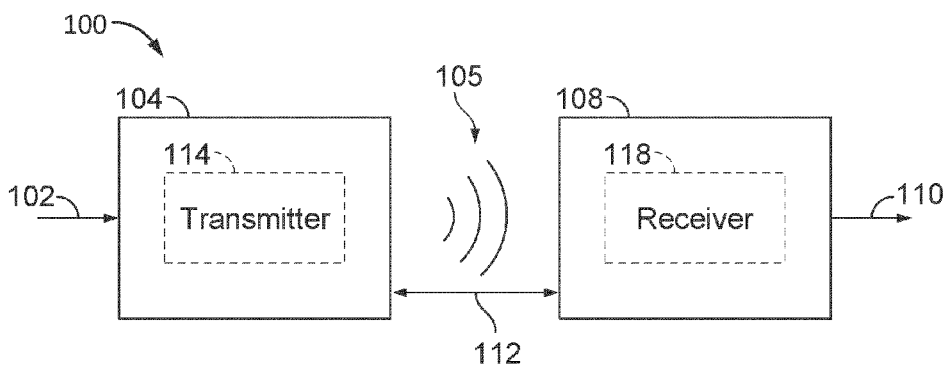
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112 and not physically in contact. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require the transmit and receive coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit antenna 114 for outputting an energy transmission. The receiver 108 further includes a receive antenna 118 for receiving or capturing energy from the energy transmission. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114. The transmit and receive antennas 114 and 118 are sized according to applications and devices to be associated therewith. As described above, efficient energy transfer may occur by wirelessly coupling a large portion of the energy in a field 105 of the transmit antenna 114 to a receive antenna 118 rather than propagating most of the energy in an electromagnetic wave to the far field. When positioned within the field 105, a "coupling mode" may be developed between the transmit antenna 114 and the receive antenna 118. The area around the transmit and receive antennas 114 and 118 where this coupling may occur is referred to herein as a coupling-mode region.

Figure 2:
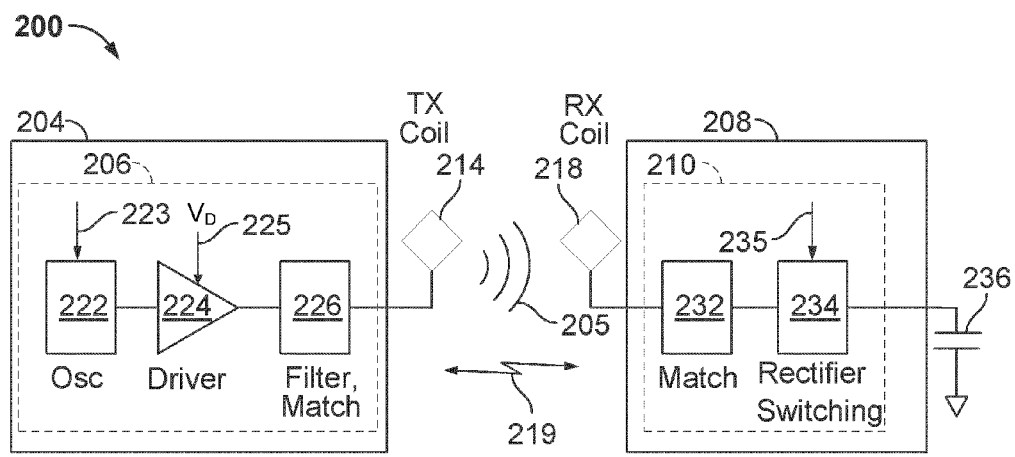
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit antenna 214 at, for example, a resonant frequency of the transmit antenna 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit antenna 214. As a result of driving the transmit antenna 214, the transmitter 204 may wirelessly output power at a level sufficient for charging or power an electronic device. As one example, the power provided may be for example on the order of 300 milliWatts to 5 Watts to power or charge different devices with different power requirements. Higher or lower power levels may also be provided.

The receiver 208 may include receive circuitry 210 that may include a matching circuit 232 and a rectifier and switching circuit 234 to generate a DC power output from an AC power input to charge it battery 236 as shown in FIG. 2 or to power a device (not shown) coupled to the receiver 108. The matching circuit 232, may be included to match the impedance of the receive circuitry 210 to the receive antenna 218. The receiver 208 and transmitter 204 may additionally communicate on a separate communication channel 219

(e.g., Bluetooth, ZigBee, cellular, etc.). The receiver 208 and transmitter 204 may alternatively communicate via in-band signaling using characteristics of the wireless field 205.

As described more fully below, receiver 208 may initially have an associated load (e.g., battery 236) which may be selectively connected or disconnected. In addition, receiver 208 may be configured to determine whether an amount of power transmitted by transmitter 204 and received by receiver 208 is appropriate for charging a battery 236. Further, receiver 208 may be configured to connect to and provide power to a load (e.g., battery 236) upon determining that the amount of power is appropriate. In some embodiments, a receiver 208 may be configured to provide power received from a wireless power transfer field to a load without charging a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
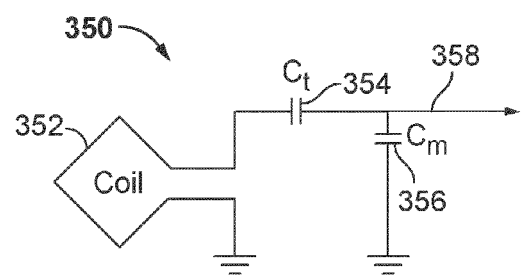
FIG. 3 is a schematic diagram of a portion of transmit circuitry or receive circuitry of FIG. 2 including a transmit or receive antenna, in accordance with exemplary embodiments of the invention.

FIG. 3 is a schematic diagram of a portion of transmit circuitry 206 or receive circuitry 210 of FIG. 2 including a transmit or receive antenna 352, in accordance with exemplary embodiments of the invention. As illustrated in FIG. 3, transmit or receive circuitry 350 used in exemplary embodiments including those described below may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, an antenna 352 is an example of a "power transfer component" of a type that is configured to wirelessly output and/or receive power. The antenna 352 may be configured to include an air core or a physical core such as a ferrite core (not shown). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmit antenna 214 coil to the receive antenna 218 residing in the neighborhood where this field 105 is established rather than propagating the energy from the transmit antenna 214 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, antenna 352 and capacitor 354 may be added to the transmit or receive circuitry 350 to create a resonant circuit that selects a signal 356 at a resonant frequency. Accordingly, for larger diameter antennas, the size of capacitance needed to sustain resonance may decrease as the diameter or inductance of the loop increases. Furthermore, as the diameter of the antenna increases, the efficient energy transfer area of the near-field may increase. Other resonant circuits formed using other components are also possible. As another non-limiting example, a capacitor may be placed in parallel between the two terminals of the antenna 350. For transmit antennas, a signal 358 with a frequency that substantially corresponds to the resonant frequency of the antenna 352 may be an input to the antenna 352.

In one embodiment, the transmitter 104 may be configured to output a time varying magnetic field with a frequency corresponding to the resonant frequency of the transmit antenna 114. When the receiver is within the field 105, the time varying magnetic field may induce a current in the receive antenna 118. As described above, if the receive antenna 118 is configured to be resonant at the frequency of the transmit antenna 118, energy may be efficiently transferred. The AC signal induced in the receive antenna 118 may be rectified as described above to produce a DC signal that may be provided to charge or to power a load.

Figure 4:
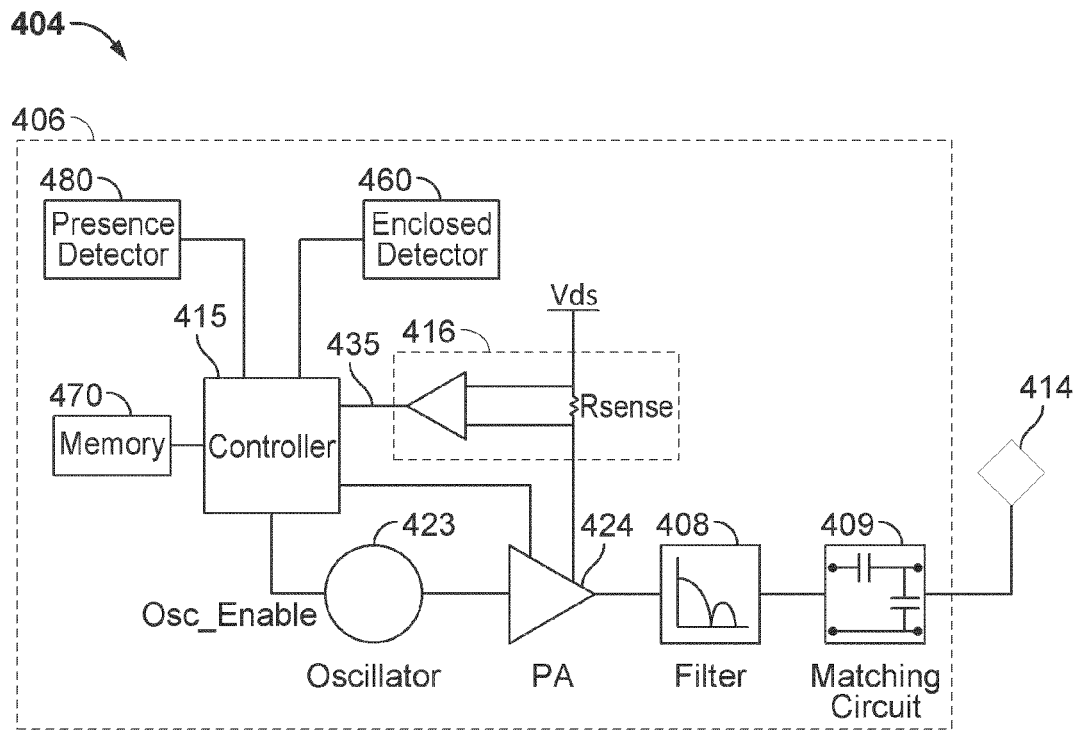
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit antenna 414. The transmit antenna 414 may be the antenna 352 as shown in FIG. 3. Transmit circuitry 406 may provide RF power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 6.78 MHz ISM band.

Transmit circuitry 406 may include a fixed impedance matching circuit 409 for matching the impedance of the transmit circuitry 406 (e.g., 50 ohms) to the transmit antenna 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the antenna 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit antenna 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. For example, processor 415 may be any known processor configured to execute software instructions for operating a wireless power transmitter or receiver. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit antenna 414. By way of example, a load sensing circuit 416 monitors the current flowing to the driver circuit 424, that may be affected by the presence or absence of active receivers in the vicinity of the field generated by transmit antenna 414 as will be further described below. Detection of changes to the loading on the driver circuit 424 are detects by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit antenna 414 may be implemented with a Litz wire or as an antenna strip with the thickness, width and metal type selected to keep resistive losses low. In a one implementation, the transmit antenna 414 may generally be configured for association with a larger structure such as a table, mat, lamp or other less portable configuration. Accordingly, the transmit antenna 414 generally may not need "turns" in order to be of a practical dimension. An exemplary implementation of a transmit antenna 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on, for example, by enabling the oscillator 423 or the driver circuit 424, and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. For example, a human may be distinguished from an object to be charged because the human may be detected by an infrared detector or a motion detector, but would not communicate with the transmitter 404. In some exemplary embodiments, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the electromagnetic field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time, for example, by disabling the oscillator 423 or the driver circuit 424. This feature prevents the transmitter 404, notably the driver circuit 424, from running long after the wireless devices in its perimeter are fully charged. This event may be due to the failure of the circuit to detect the signal sent from either the repeater or the receive antenna 218 that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
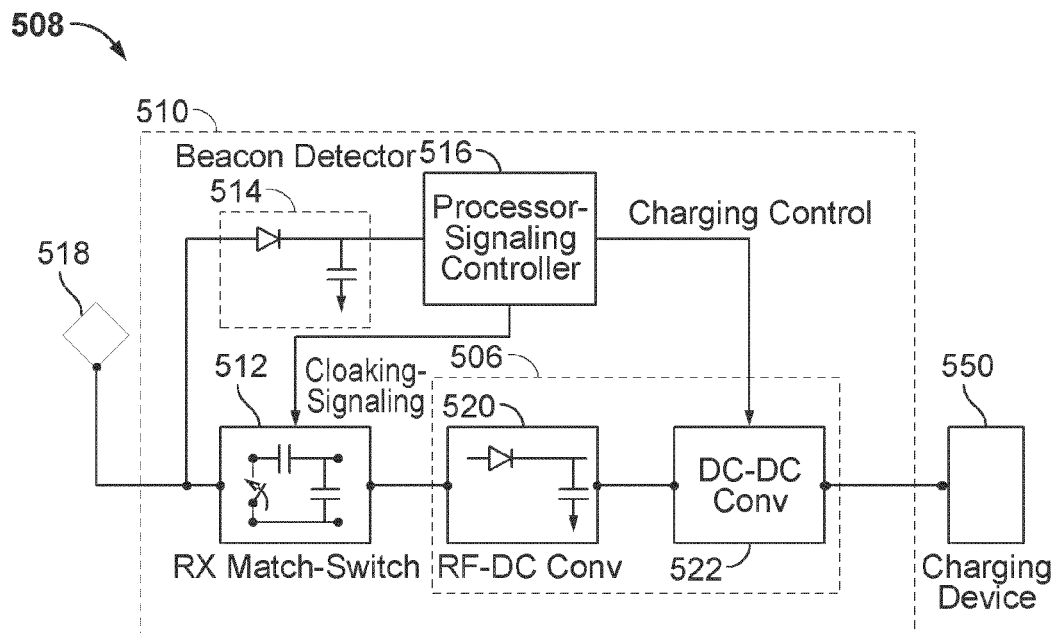
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive antenna 518. Receiver 508 further couples to device 550 for providing received power thereto. It should be noted that receiver 508 is illustrated as being external to device 550 but may be integrated into device 550. Energy may be propagated wirelessly to receive antenna 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (and other medical devices), and the like.

Receive antenna 518 may be tuned to resonate at the same frequency, or within a specified range of frequencies, as transmit antenna 414 (FIG. 4). Receive antenna 518 may be similarly dimensioned with transmit antenna 414 or may be differently sized based upon the dimensions of the associated device 550. By way of example, device 550 may be a portable electronic device having diametric or length dimension smaller that the diameter of length of transmit antenna 414. In such an example, receive antenna 518 may be implemented as a multi-turn coil in order to reduce the capacitance value of a tuning capacitor (not shown) and increase the receive coil's impedance. By way of example, receive antenna 518 may be placed around the substantial circumference of device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 522. RF-to-DC converter 520 rectifies the RF energy signal received at receive antenna 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive antenna 518 to the power conversion circuitry 506 or alternatively for disconnecting the power conversion circuitry 506. Disconnecting receive antenna 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive antenna 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identity received energy fluctuations that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
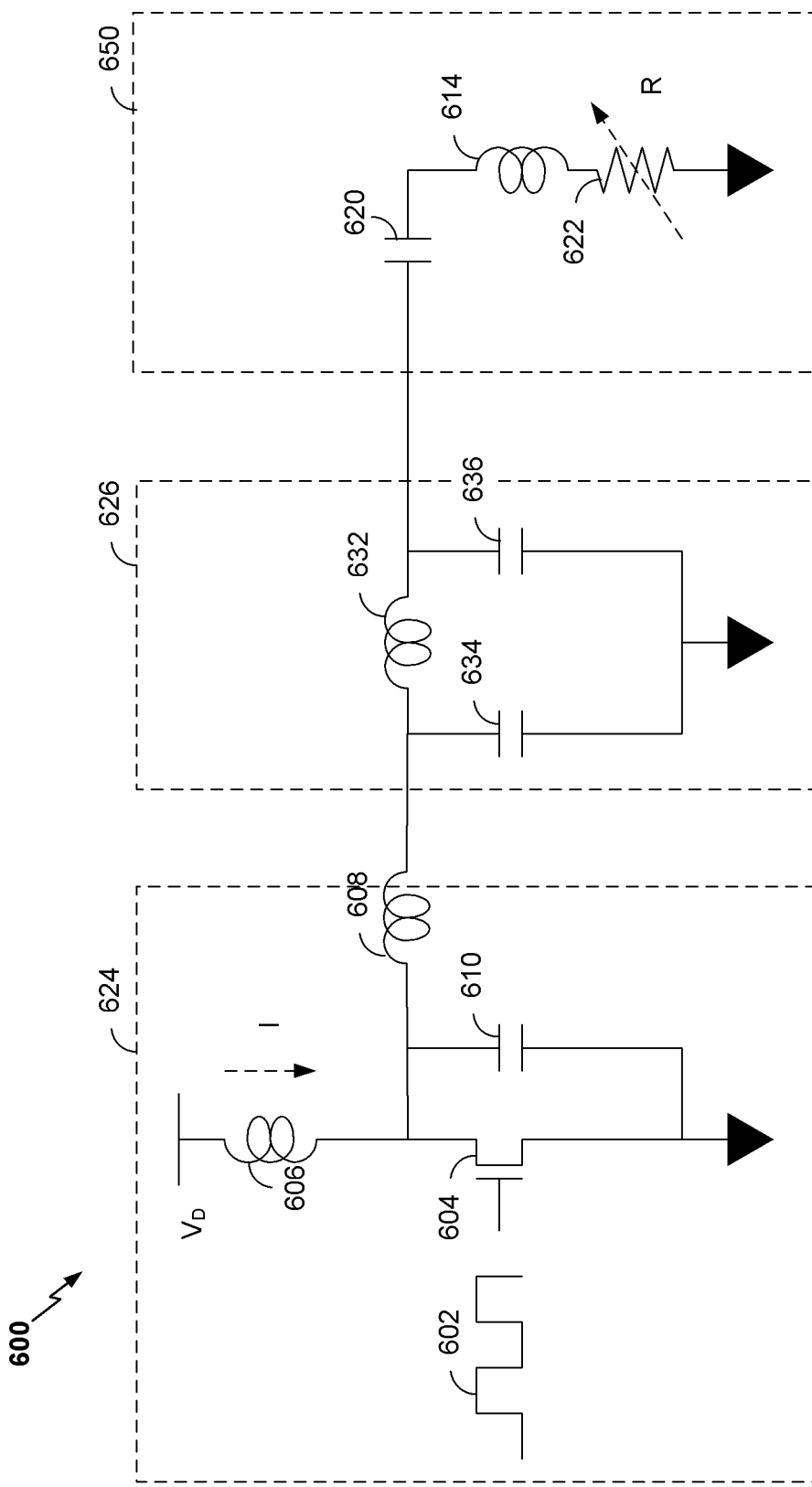
FIG. 6 is a schematic diagram of a portion of transmit circuitry that may be used in the transmit circuitry of FIG. 4.

FIG. 6 is a schematic diagram of a portion of transmit circuitry 600 that may be used in the transmit circuitry 406 of FIG. 4. The transmit circuitry 600 may include a driver circuit 624 as described above in FIG. 4. The driver circuit 624 may be similar to the driver circuit 424 shown in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier; however, any suitable driver circuit 624 may be used in accordance with embodiments of the invention. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 600 may include a filter circuit 626. The filter circuit 626 may be a three pole (capacitor 634, inductor 632, and capacitor 636) low pass filter circuit 626.

The signal output by the filter circuit 626 may be provided to a transmit circuit 650 comprising an antenna 614. The transmit circuit 650 may include a series resonant circuit having a capacitance 620 and inductance (e.g., that may be due to the inductance or capacitance of the antenna or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

In some circumstances, if multiple transmitters, such as those discussed above are simultaneously transmitting and are nearby one another, there may be undesirable results. For example, a first transmitter wirelessly transmitting power, may unintentionally inductively couple with a second transmitter. In a first scenario, the first transmitter's circuitry may be damaged by experiencing an unexpected loading due to the second transmitter. In other words, the first transmitter experiences the second transmitter as a large load (rather than the smaller load of a receiver circuit (e.g. FIG. 5). In a second scenario, the second transmitter's circuitry may be damaged due to unintentionally acting as a receiver circuit. In other words, when the first and transmitter become unintentionally inductively coupled, the second transmitter may be damaged by power received from the first transmitter. One approach to mitigate damage is to disconnect or shunt the transmit antenna. An example of such a protection scheme is disclosed in U.S. patent application Ser. No. 13/837,638 to Ryan Tseng et. al., the disclosure of which is incorporated herein by reference in its entirety.

When a transmitter is in an off-state, damage is prevented because power received (i.e. the antenna can receive power passively without the circuit being "on") is prevented from being delivered to the sensitive circuitry of the transmitter. In addition, upon transition from the off-state to an on-state, before powering the transmit antenna, sensing and control circuits determine that the antenna is not receiving potentially damaging power. If the antenna is receiving potentially damaging power, the transmitter should not attempt to transmit power.

Figure 7:
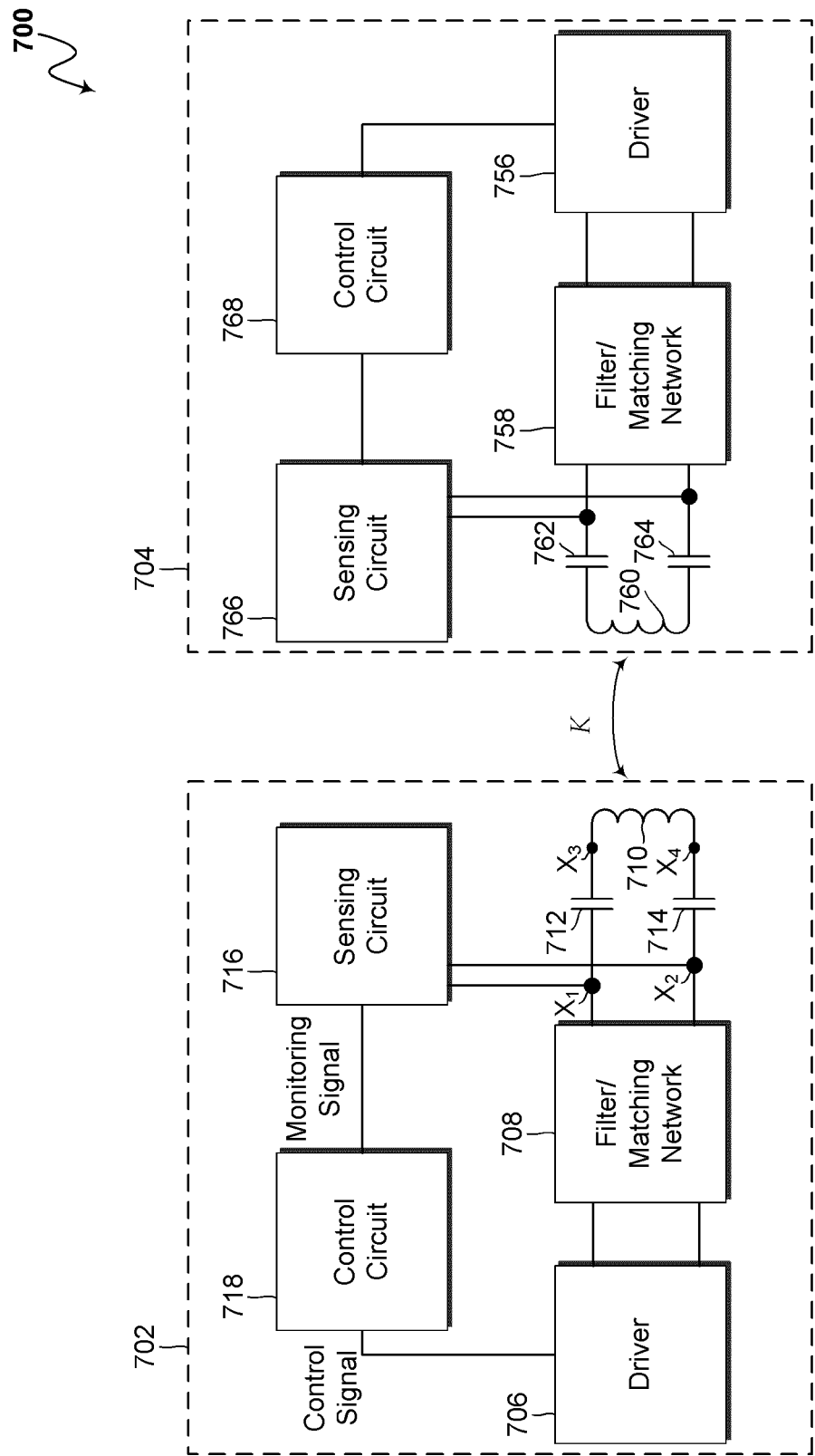
FIG. 7 is a functional block diagram of a wireless power transfer system that includes first and second transmitters such as that of FIG. 1, in accordance with exemplary embodiments of the invention.

FIG. 7 is a functional block diagram of a wireless power transfer system 700 that includes first and second transmitters 702, 704 such as that of FIG. 1, in accordance with exemplary embodiments of the invention. The first transmitter 702 includes a driver 706, a filter and/or matching network ("filter") 708, a transmit antenna 710 interconnected to the filter 708 by AC coupling capacitors 712, 714, a sensing circuit 716, and a control circuit 718. The second transmitter 704 includes a driver 756, a filter and/or matching network ("filter") 758, a transmit antenna 760 interconnected to the filter 758 by AC coupling capacitors 762, 764, a control circuit 768, and a sensing circuit 766.

The first and second transmitters 702, 704 may each include transmit circuitry similar to the transmit circuitry discussed above, such as transmit circuitry 114, 206, 406, and 600 of FIGS. 1, 2, 4, and 6, respectively. For example, the driver 706 and the filter network 708 of the first transmitter 702 can be configured to provide a transmit power signal (e.g., an RF oscillating signal across nodes $X_1$ and $X_2$) as an output for powering the transmit antenna 710. The AC coupling capacitors 712, 714 can be disposed between the filter 708 and the transmit antenna 710 to block DC signals while passing AC signals to power the transmit antenna 710. As a result, the oscillating transmit power signal can pass through the AC coupling capacitors 712, 714 and power the transmit antenna 710.

The transmit antenna 710 is configured to receive the transmit power signal as an input and configured to generate a wireless field sufficient to charge one or more electronic devices. For example, the transmit antenna 710 can generate the wireless field by receiving the power transmit signal via the AC coupling capacitors 712, 714 to generate wireless energy or a time-varying field (e.g., electromagnetic flux) about the transmit antenna 710. The transmit antenna 710 may be similar to the antennas discussed above, such as antennas 214, 352, and 414 of FIGS. 2, 3, and 4, respectively. As one example, the power provided may be, for example, about 300 milliWatts to 5 Watts to power or charge different devices with different power requirements. Higher or lower power levels may also be provided.

In addition, the first transmitter 702 may operate at any suitable frequency. By way of example, the first transmitter 702 may operate at the 6.78 MHz ISM band. In addition, the second transmitter 704 can be configured to perform in a manner in accordance with the above-described embodiments.

In operation, the first transmitter 702 may become wirelessly coupled with a separate electronic device positioned at a distance from the first transmitter 702. For example, a wirelessly chargeable device (not shown), such as mobile cellular phone, having a receive antenna can be positioned in close proximity of the first transmitter 702, and the receive antenna can couple to the wireless field generated by the transmit antenna 710 of the first transmitter 702. Accordingly, wireless power can be transferred from the first transmitter 702 to the wirelessly chargeable device to selectively power the wirelessly chargeable device directly or to charge a rechargeable battery of the wirelessly chargeable device.

In addition, the first transmitter 702 may potentially come into proximity with another wireless power transmitter device, such as the second transmitter 704. If one or both transmitters 702, 704 or generating a wireless field, the first and second transmitters 702, 704 may become wirelessly coupled. This transmitter-to-transmitter coupling may occur even where one of the transmitters is not transmitting power or is unpowered. Without protection, the transmitter-to-transmitter coupling may cause damage or interfere with the operation of either transmitter 702, 704.

Accordingly, one of several aspects of certain embodiments pertains to protection systems against transmitter-to-transmitter coupling. It will be appreciated that "protection against transmitter-to-transmitter coupling" as used herein can include inhibition or attenuation of the unwanted effects of transmitter-to-transmitter coupling at one or both transmitters, and does not necessarily include prevention of coupling between the two transmitters. For example, protection against transmitter-to-transmitter coupling may include operating the first transmitter 702 such that it is tolerant to received wireless power. In another embodiment, the first transmitter 702 is configured to operate in a manner as to avoid damaging the second transmitter 704. For example, the power level of the wireless field generated by the transmit antenna 710 of the first transmitter 702 may be reduced to a level safe for the second transmitter 704 to receive. Alternatively or additionally, one of several aspects of certain embodiments pertains to protection systems for a transmitter (for example, the first transmitter 702) that has wirelessly coupled to another foreign object (e.g., an object not intended to be in proximity with the transmit antenna 710 during operation). For example, the first transmitter 702 may be configured to reduce a power level of the generated wireless field if a presence of a foreign object is detected to be in the proximity of the transmit antenna 710.

Accordingly, with continued reference to FIG. 7, the sensing circuit 716 and the control circuit 718 can form a transmitter protection sub-system for protection against transmitter-to-transmitter coupling. The sensing circuit 716 can be configured to sense at one or more nodes of the first transmitter 702 and configured to generate a monitoring signal as an output. For example, the sensing circuit 716 can generate the monitoring signal by sensing or detecting one or more electrical characteristics of the first transmitter 702. The monitoring signal can provide an indication of whether the transmit antenna 710 is receiving wireless power from the second transmitter 704. In some embodiments, the monitoring signal can be based on several detected characteristics, such as power, load impedance, and/or certain characteristics of the signal waveform (for example, a presence of reoccurring beats or pulses, frequency content, and the like), among others. As will be described in greater detail below, the monitoring signal can be used to control or modify the powering of the transmit antenna 710 while it is receiving wireless power from the second transmitter 704.

In certain embodiments, the electrical characteristics can correspond to a voltage across two nodes $X_1$ and $X_2$ of the first transmitter 702 as show in FIG. 7. Alternatively or additionally, the electrical characteristics can include electrical characteristics detected at one or more of $X_3$, $X_4$, $X_5$, or $X_6$ as show in FIG. 7. It will be appreciated that electrical characteristics can include any other suitable measurable characteristics, such as current, impedance, power, and the like. It will be further appreciated that the electrical characteristics can be sensed at any other applicable nodes of the first transmitter 702.

The control circuit 718 can be configured to receive the monitoring signal as an input and to generate a control signal 718 for controlling wireless power transmission as an output. For example, the control circuit can generate the control signal to prevent or inhibit wireless power transmission if the monitoring signal indicates, for example, the presence of the second transmitter 704 generating a wireless field that results in received wireless power at the transmit antenna 710 of the first transmitter 702.

In some embodiments, the control circuit 718 controls a power level of the driver 706 based at least on the monitoring signal. The power level of the driver 707 can affect the power level of the wireless field generated by the transmit antenna 710. The control signal can inhibit the driver 706 from powering the transmit antenna 710 when the monitoring signal indicates that the transmit antenna 710 is receiving wireless power from a foreign antenna such as the transmit antenna 760 of the second transmitter 704.

The protection sub-system can prevent transmitter-to-transmitter coupling during various modes of operation. For example, when the transmitter 702 transitions from the off-state to the on-state, before allowing power to transfer between the driver 706 and the transmit antenna 710, the sensing and control circuits 716, 718 determine whether the transmit antenna 710 is receiving a potentially damaging electromagnetic field and/or power, such as from the second transmitter 704. If the transmit antenna 710 is receiving potentially damaging power, energy and/or power is inhibited or prevented from transferring between the driver 706 and the transmit antenna 710. For example, a bias of the driver 706 can be reduced. If the transmit antenna 710 is not receiving potentially damaging power, power is allowed to transfer between the driver 706 and the transmit antenna 710, for example, in accordance with nominal operation.

In addition, the protection sub-system can provide protection when the transmitter 702 is in an on-state and is transmitting wireless power. In one embodiment, the sensing and control circuits 716, 718 is configured to perform sensing while the transmitter 702 is transmitting to determine potentially damaging electromagnetic field and/or power is being received, such as from the second transmitter 704. If the transmit antenna 710 is receiving potentially damaging power, energy and/or power is inhibited or prevented from transferring between the driver 706 and the transmit antenna 710. For example, a bias of the driver 706 can be reduced. If the transmit antenna 710 is not receiving potentially damaging power, power is allowed to continue to transfer between the driver 706 and the transmit antenna 710, for example, in accordance with nominal operation.

In a certain embodiment, the transmitter 702 is configured to maintain electrical coupling between the transmit antenna 710 from the driver 706 when the monitoring signal indicates that the transmit antenna 710 is receiving wireless power from the foreign antenna. That is, the control circuit 718 does not decouple the transmit antenna 710 from the remainder of the transmitter 702 circuitry. In certain embodiments, the transmitter 702 includes a blocking circuit of one or more diodes or switches (e.g., transistors such as MOSFETs) configured to block wireless power received by the transmit antenna 710. For example the driver 706 and/or the filter 708 contains diodes arranged such that wireless power received by the transmit antenna 710 is inhibited from propagating to sensitive circuitry of the transmitter 702. In another embodiment, the driver 706 and/or the filter 708 include one or more high-voltage components configured such that the driver 706 and the filter 708 are tolerant to receiving foreign wireless power. By maintaining coupling, large and costly relays and power switches need not be used for implementation.

Figure 8:
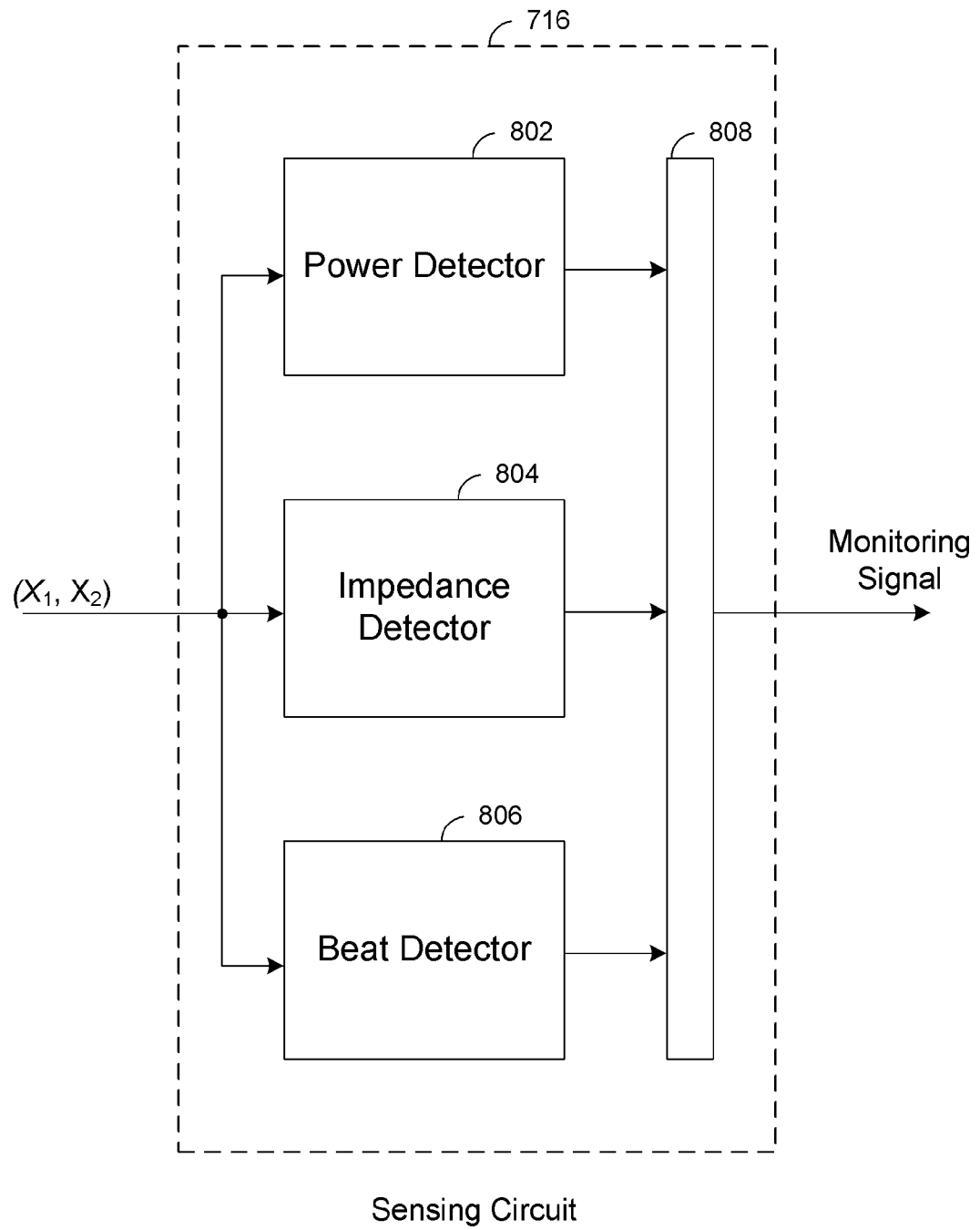
FIG. 8 is a functional block diagram of the sensing circuitry of FIG. 7 that may be used in a transmitter such as one or more of the transmitters of FIG. 7, in accordance with exemplary embodiments of the invention.

FIG. 8 is a functional block diagram of the sensing circuitry 716 of FIG. 7 that may be used in a transmitter such as one or more of the transmitters 702, 704 of FIG. 7, in accordance with exemplary embodiments of the invention. The sensing circuit 716 includes a power detector 802, and impedance detector 804, a beat detector 806, and a signal mixer 808.

In the illustrated embodiment, the sensing circuit 716 is configured to receive one or more measurements $X_1$ and $X_2$ as inputs, and is configured to generate the monitoring signal as an output. Alternatively or additionally, the measurements can correspond to one or more of $X_3$, $X_4$, $X_5$, or $X_6$ as show in FIG. 7. The monitoring signal provides an indication of whether the foreign wireless power is being received by the transmit antenna 710 of the transmitter 702. The indication that the transmit antenna 710 is receiving wireless power from the foreign antenna is based at least on a combination of one or more of a detected power level, a detected load impedance, or a detected plurality of pulses sensed at the one or more nodes of the transmitter.

The illustrated power detector block 802 is configured to receive the measurements $X_1$ and $X_2$ and/or additional sensing points (e.g., $X_3$, $X_4$, $X_5$, and/or $X_6$) to detect transmitted power. The detected power level signal provides an indication of the power flow at the transmit antenna 710. For example, the power detector block 802 can be configured to measure outgoing power and load impedance at a transmit antenna by monitoring X1 and X2. In one embodiment, the power detector block 802 detects the local power at the antenna, rather the measuring foreign power directly. The power measurements can be used to sense a discrepancy between outgoing power and other monitored signal levels, and the discrepancy can indicate the amount of foreign power being received and/or the presence of external power transmitters.

The impedance detector 804 is configured to receive the measurements $X_1$ and $X_2$ and/or additional sensing points to detect load impedance. For example, the impedance detector 804 can receive measurements based on the transmit antenna 710 voltage and current to compute the load impedance at the transmit antenna 710. The detected load impedance signal can provide an indication of whether the transmit antenna 710 is receiving wireless power from a foreign transmit antenna. For example, the load impedance may increase due to coupling with a powered foreign antenna. Furthermore, the detected load impedance may provide an indication of whether the transmit antenna 710 is coupled to an unpowered transmit antenna. For example, the detected load impedance may decrease due to coupling with an unpowered foreign antenna.

The illustrated beat detector 806 is configured to receive the measurements $X_1$ and $X_2$ as inputs and is configured to generate a beat detection signal as an output. The beat detection signal can provide an indication that a source, such a powered foreign transmitter, is coupled to the transmit antenna 710. For example, a wireless power source (as opposed to a pure load) provides wireless power and has a reactance/impedance phasor that can rotate with respect to the power source of the transmitter. As a result of the interference, the voltage at the transmit antenna 710 can have a plurality of beat pulses as the phasor of the foreign source rotates relative to the phasor of the transmitter. The beat detection signal can relate to the number and/or intensity of the beat pulses. As a non-limiting example, the beat detector 806 can include one or more bandpass filters, corresponding integrators, and a summer. The bandpass filters, each having a respective pass band, can each receive $X_1$ and $X_2$ as inputs. The outputs of the bandpass filters can be passed to the integrators to integrate the bandpassed signals over a sample period. After the sample period, the integrators can be reset. The integrated bandpassed signals can provide an indication of the number of beats and the intensity of the beat signal within the respective pass band. The summer can combine the outputs of the integrators to provide an indication of the presence of beats over the total frequency range of the combined pass band.

The signal mixer 808 is configured to receive the outputs of the power detector 802, the impedance detector 804, and the beat detector 806 as inputs and is configured to generate the monitoring signal as an output. For example, in some embodiments the monitoring signal can be based on a weighted combination of one or more of the outputs of the power detector 802, the impedance detector 804, or the beat detector 806. In another embodiment, the signal mixer 808 can include a logical block configured to generate the monitoring signal based on a logical relationship with at least one of the outputs of the power detector 802, the impedance detector 804, or the beat detector 806. For example, the signal mixer 808 can implement a logical-OR circuit such that any one of the detected power level, the detected load impedance, or the detected plurality of pulses sensed can affect the monitoring signal.

In one embodiment, the sensing circuit 716 is configured to perform sensing for at least a duration while the transmit antenna 710 is powered. In another embodiment, the sensing circuit 716 is configured to perform sensing for at least a duration while the transmit antenna 710 is unpowered. For example, the sensing circuit 716 can be configured to sense for a powered foreign antenna just prior to initializing and powering the transmit antenna 710.

Figure 9:
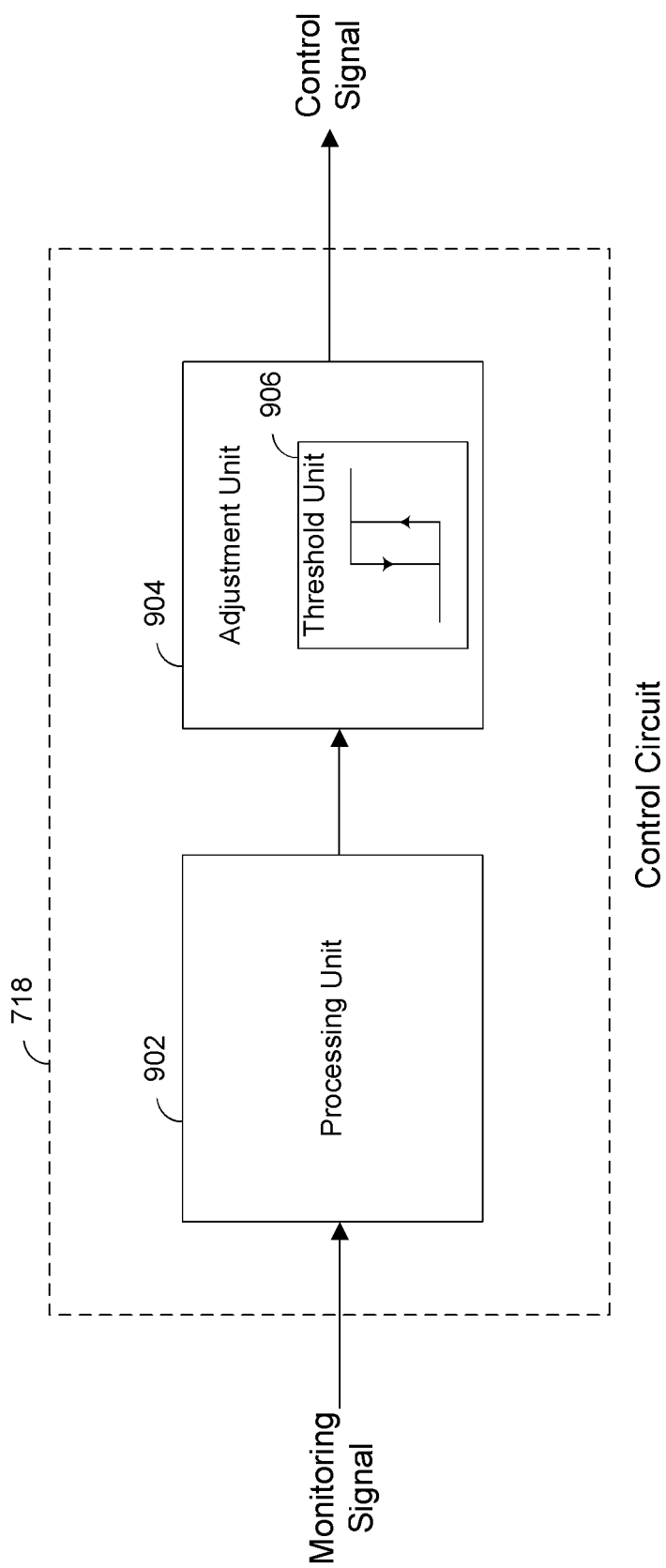
FIG. 9 is a functional block diagram of the control circuitry of FIG. 7 that may be used in a transmitter such as one or more of the transmitters of FIG. 7, in accordance with exemplary embodiments of the invention.

FIG. 9 is a functional block diagram of the control circuit 718 of FIG. 7 that may be used in a transmitter such as one or more of the transmitters 702, 704 of FIG. 7, in accordance with exemplary embodiments of the invention. The control circuitry can include a processing unit 902, an adjustment unit 904, and a threshold unit 906 of the adjustment unit 904.

The processing unit 902 is configured to receive the monitoring signal as an input and is configured to generate a processed monitoring signal as an output. For example, the processing unit 902 may perform filtering operations to precondition or process the monitoring signal. In some embodiments, the processing unit 902 includes an analog-to-digital converter to generate samples of the monitoring signal for input to the adjustment unit 904.

The adjustment unit 904 is configured to receive the processed monitoring signal as an input and is configured to generate the control signal as an output. For example, the adjustment unit 904 can generate the control signal to reduce (partially or completely) the power level of the driver 706 and, in turn, the power level of the wireless power field. In one embodiment, the driver 706 is inhibited from powering the transmit antenna 710 if the monitoring signal indicates that the received wireless power is above a threshold. For example, the threshold unit 906 may receive the processed monitoring signal and test whether the processed monitoring signal is above a threshold. The threshold can have a first value when the transmit antenna 710 is powered and can have a second value when the transmit antenna 710 is unpowered. The threshold can be selected based on various considerations, including the operational limits of the first transmitter, sensitivity to false positives, levels caused by certain foreign objects, and the like. For instance, the one or more thresholds can be selected based on certain foreign objects that it would be desirable to protect against. For example, a second transmitter 704 that is the same product as the first transmitter 702 can be one example. Accordingly, thresholds can be determined then based on various responses caused by coupling the first transistor 702 with the second transistor 704. The first and second values can be different values to account for effects of a powered and unpowered transmit antenna 710, and to prevent rapid switching or chattering between taking protective action and not taking protective action.

In some embodiments, the control circuit 718 is further configured to reduce the power level of the driver 706 if the monitoring signal indicates that the transmit antenna 710 is wirelessly coupled to unpowered foreign transmit antenna. For example, the transmit antenna 710 of the transmitter may resonate with a foreign transmit antenna. In this case, the monitoring signal can provide an indication that the transmit antenna 710 is coupled to an unintended resonant structure.

FIGS. 10A-10D are schematic diagrams of a controllable driver circuitry 1000A-D, respectively, that may be used in a transmitter such as one or more of the transmitters 702, 704 of FIG. 7, in accordance with exemplary embodiments of the invention. The control circuit (or the control signal) is configured to modify (e.g., reduce) the power level of the driver by controlling at least one of a bias input, a radio frequency driver input signal, or a clock input. For instance, the controllable driver circuitry 1000A of FIG. 10A includes the oscillator 222 and the driver circuit 224 of FIG. 2, as well as a tuning unit 1002A. The tuning unit 1002A is configured to pass $V_{DS}$ variably to bias the driver 224 in accordance with the control signal. The control signal can configure the tuning unit 1002A to block the bias voltage $V_{DS}$ if, for example, a powered foreign antenna is detected. The configuration of FIG. 10A can facilitate a simpler and cheaper design with respect to the tuning unit because the bias voltage $V_{DS}$ is relatively constant. Thus, bandwidth of the tuning unit may not be a substantial consideration.

Figure 10A:
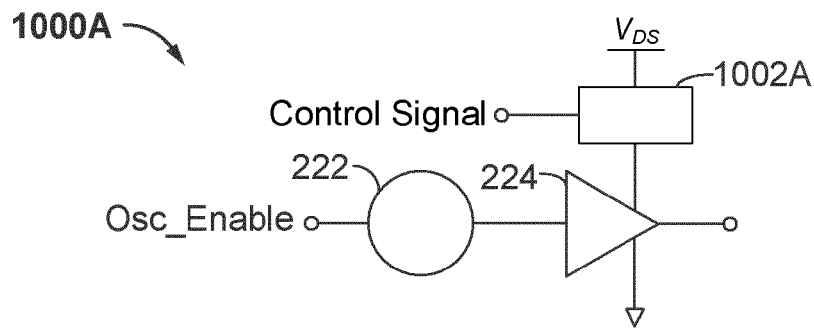
FIGS. 10A-10D are schematic diagrams of a controllable driver circuitry that may be used in a transmitter such as one or more of the transmitters of FIG. 7, in accordance with exemplary embodiments of the invention.
Figure 10B:
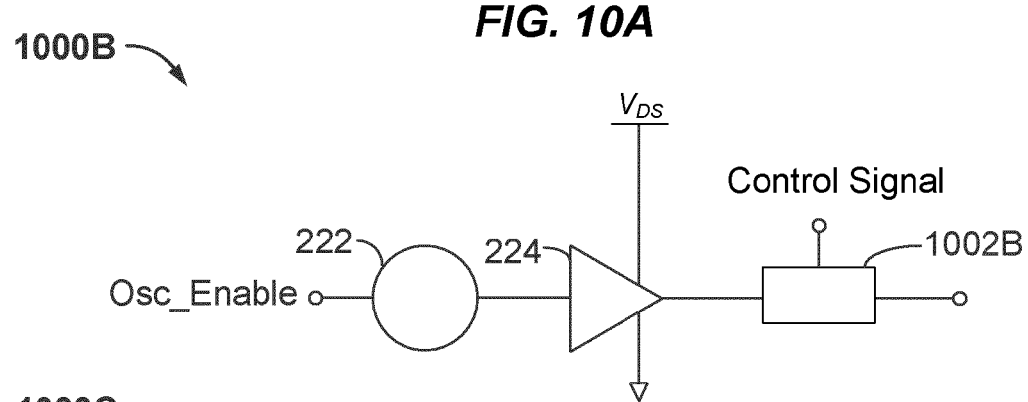
Figure 10C:
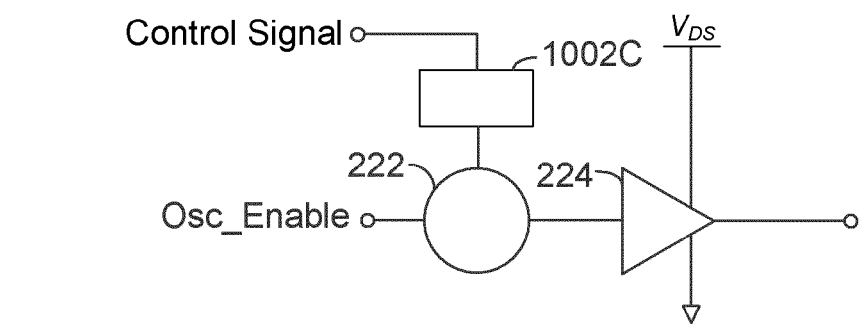
Figure 10D:
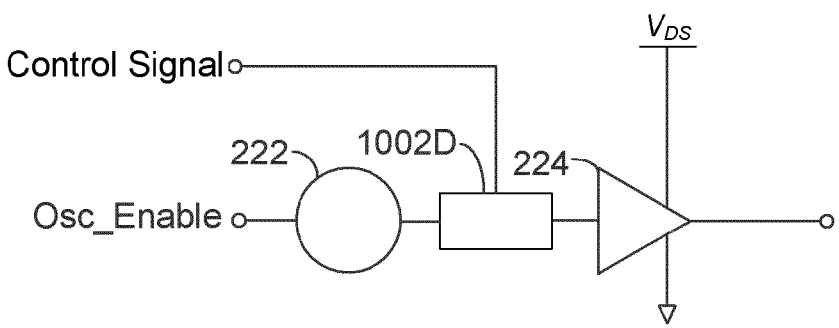

Elements of FIGS. 10B-10D common to FIG. 10A share common reference indicia, and only differences between the figures are described herein for the sake of brevity. The controllable driver circuitry 1000B of FIG. 10B includes a tuning unit 1002B. The tuning unit 1002B is configured to variably pass the output of the driver 224 in accordance with the control signal. For example, the tuning unit 1002B has an input configured to receive the output of the driver 224, has a second input configured to receive the control signal, and has an output configured to provide output in accordance with the control signal. The control signal can configure the tuning unit 1002B to block the output of the driver 224 if, for example, a powered foreign antenna is detected. The configuration of FIG. 10B can facilitate a robust design. For example, the tuning unit 1002B can, in some embodiments, block foreign power from propagating to the driver 224 and the oscillator 222.

The controllable driver circuitry 1000C of FIG. 10C includes a tuning unit 1002C. The tuning unit 1002C is configured to variably adjust an RF clock to the oscillator 222 in accordance with the control signal. In some embodiments the tuning unit 1002C is configured to adjust the clock of the driver 224. The control signal can configure the tuning unit 1002C to adjust the clock frequency to, for example, DC and disable the oscillator 222. Thus, the driver 224 should generate no output. The configuration of FIG. 10C can facilitate a power efficient design since the clock signal may be a small amplitude signal and thus blocking and passing the signal can result improved power efficiency.

The controllable driver circuitry 1000D of FIG. 10D includes a tuning unit 1002D. The tuning unit 1002D is configured to variably adjust an RF input to the driver 224 in accordance with the control signal. In some embodiments the tuning unit 1002D is configured to adjust the RF input of the driver 224. The control signal can configure the tuning unit 1002D to adjust RE driver input to, for example, disable the driver 224. Thus, the driver 224 should generate no output. The configuration of FIG. 10D can be an efficient design with respect to power loss. This can be true because the clock signal may be a small amplitude signal and thus controlling the clock signal rather a power-type signal can result in improved power efficiency.

Figure 11:
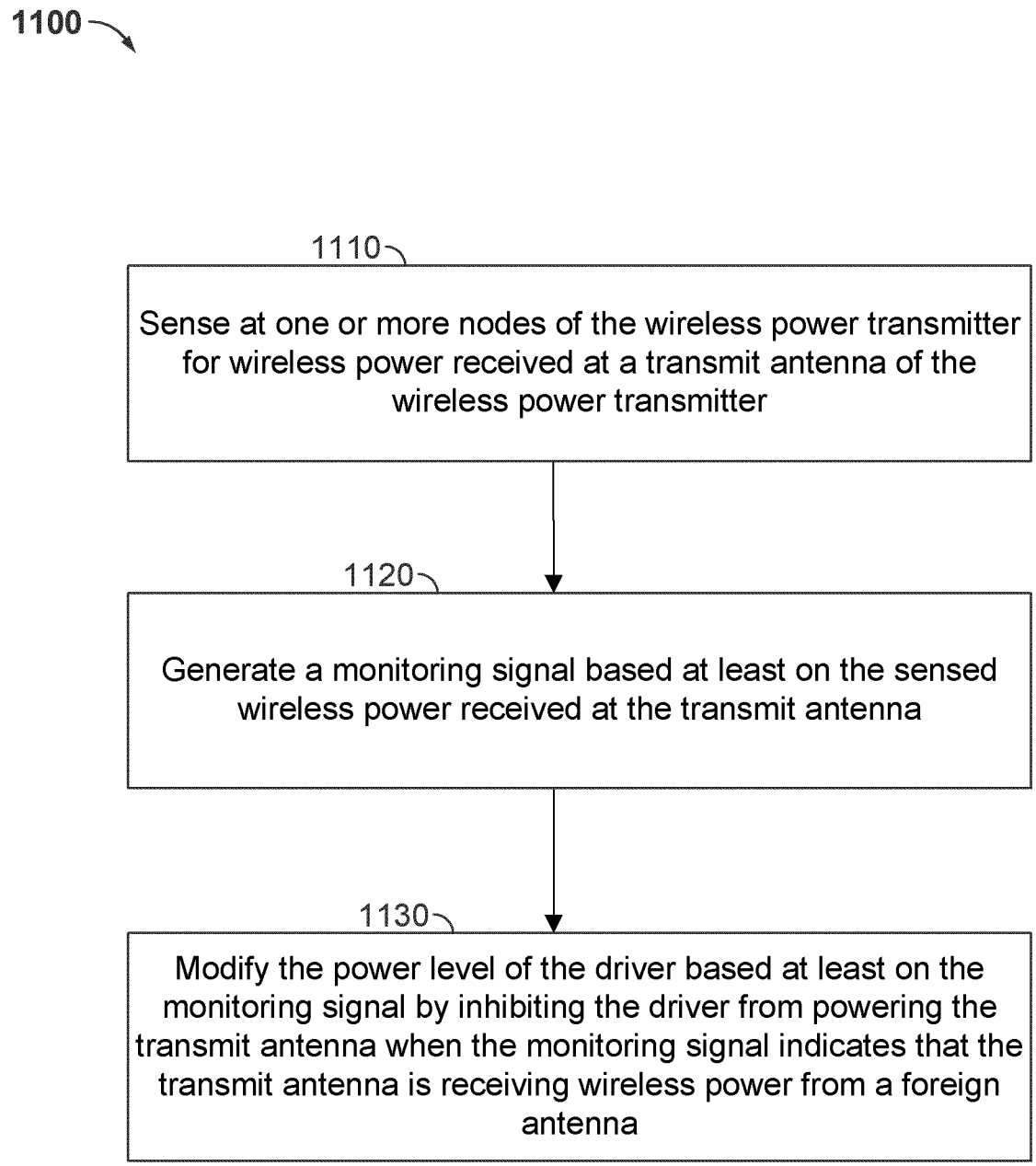
FIG. 11 is a flowchart diagram of a method of protecting a transmitter, in accordance with exemplary embodiments of the invention.

FIG. 11 is a flowchart diagram of a method 1100 of protecting a transmitter, in accordance with exemplary embodiments of the invention. The method 1100 starts at block 1110 for sensing at one or more nodes of the wireless power transmitter for wireless power received at a transmit antenna 710 of the wireless power transmitter. For example, the sensing circuit 716 of FIG. 7 can sense voltage at nodes $X_1$ and $X_2$ of the first transmitter 702. As stated, the transmit antenna 710 is configured to generate a wireless field sufficient to charge one or more electronic devices. The first transmitter 702 includes a driver 706 configured to power the transmit antenna 710 for generation of the wireless field. A power level of the wireless field is based at least on a power level of the driver 706.

After and/or during sensing, the method proceeds to block 1120 for generating a monitoring signal based at least on the sensed wireless power received at the transmit antenna. For example, the sensing circuit 716 of FIGS. 7 and 8 receives the sensed characteristics as inputs and generates the monitoring signal as output.

Once the monitoring signal is generated, the method 1100 can move to block 1130 for controlling the power level of the driver based at least on the monitoring signal by inhibiting the driver from powering the transmit antenna when the monitoring signal indicates that the transmit antenna is receiving wireless power from a foreign antenna. For example, the control circuit 718 of FIGS. 7 and 9 can receive the monitoring signal and can generate the control signal to control the power level of the driver 706. For instance, FIGS. 10A-D shows for embodiments of an adjustable driver 1000A-D.

Figure 12:
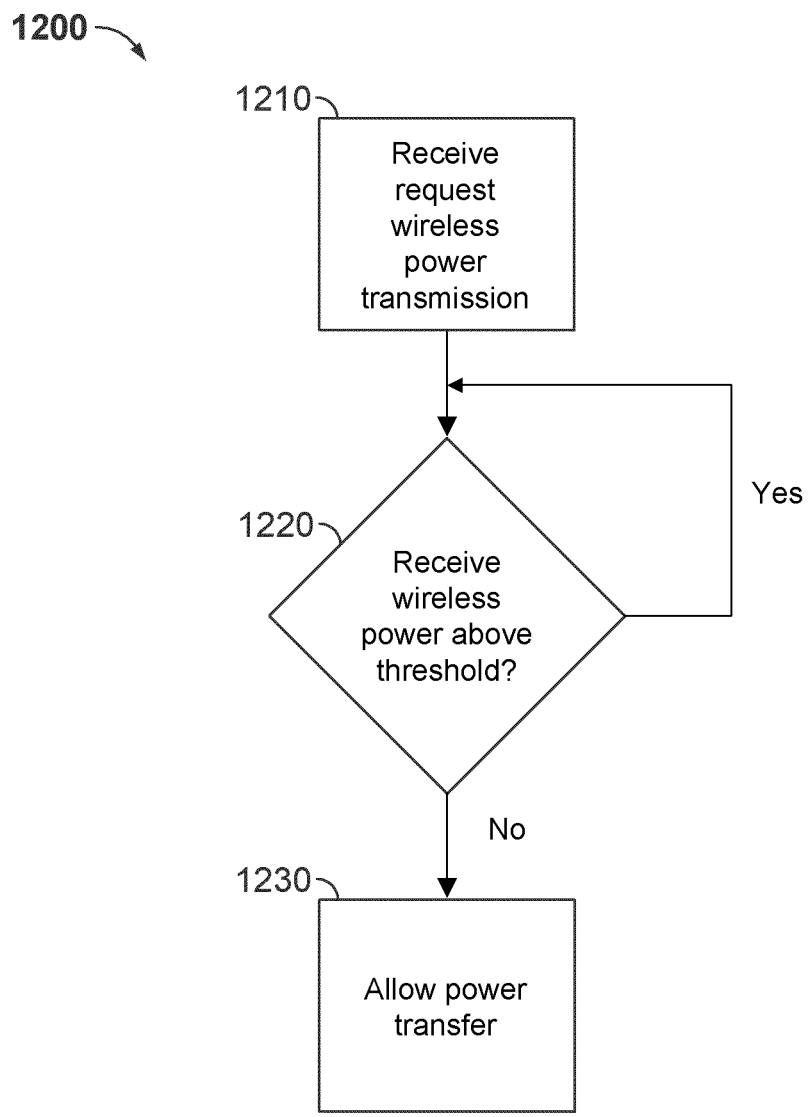
FIG. 12 is a flowchart diagram of a method of protecting a transmitter while initiating wireless power transmission, in accordance with exemplary embodiments of the invention.

FIG. 12 is a flowchart diagram of a method 1200 of protecting a transmitter while initiating wireless power transmission, in accordance with exemplary embodiments of the invention. The method 1200 can start at block 1210 for receiving a request for wireless power transmission while the transmit antenna is not transmitting. In one embodiment, for example, the first transmitter 702 of FIG. 7 is on and the transmit antenna 701 is in an unpowered state. When the first transmitter receives a request to power the transmit antenna 710, the method 1200 proceeds to block 1220 for testing whether the received wireless power is above threshold. For example, the sensing and control circuits of FIGS. 7-9 can sense and measure the amount of power received by the transmit antenna 710 from, for example, the second transmitter 720. If the received power is above a threshold, the method 1200 returns to block 1120 to test again whether the received power exceeds the threshold. For example, the driver 706 is not permitted to power the transmit antenna 710 while the received wireless power exceeds the threshold.

If the received wireless power is less than the threshold, the method 1200 proceeds to block 1230 for allowing wireless power transfer by the transmit antenna. For example, the control circuit 718 permits the driver 706 to power the transmit antenna 710 to selectively charge or power one or more electronic devices.

Figure 13:
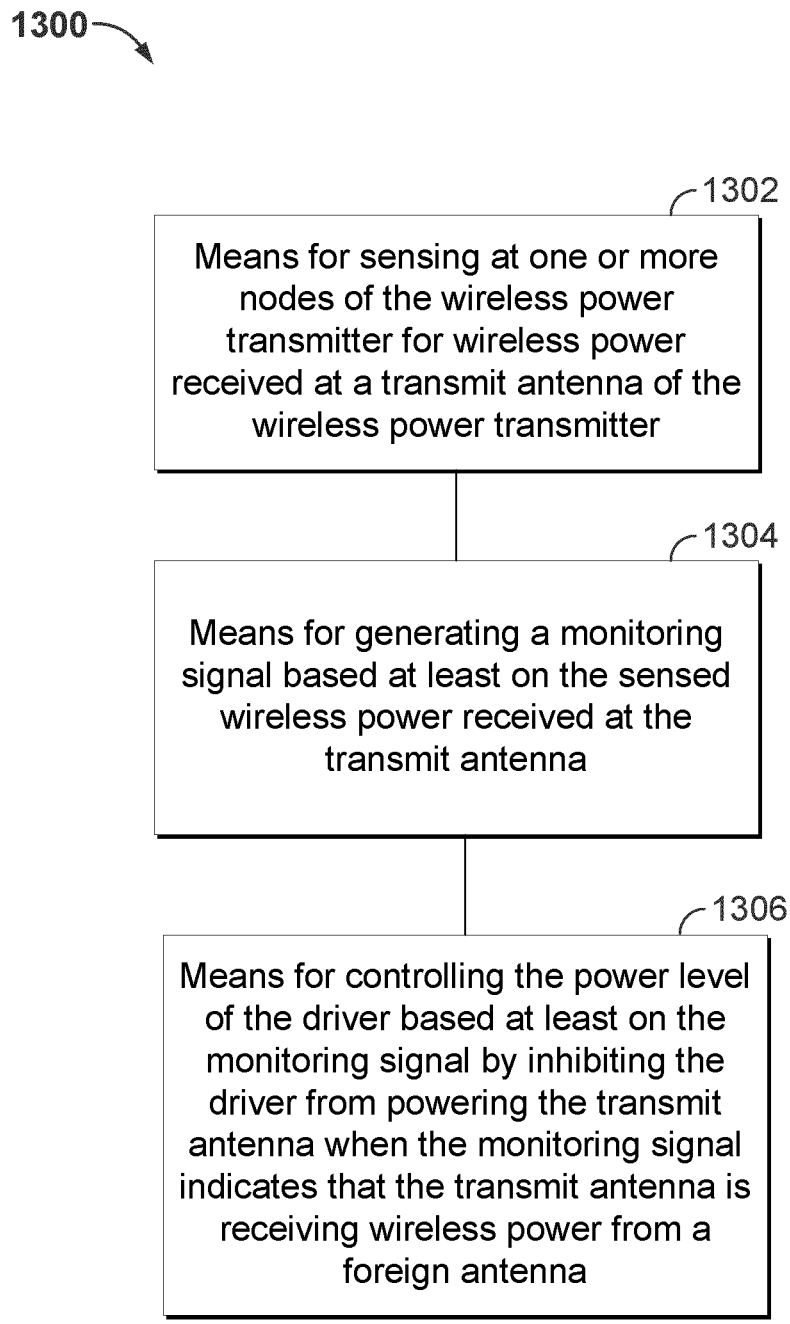
FIG. 13 is a functional block diagram of a wireless power transmitter, in accordance with an exemplary embodiment.

FIG. 13 is a functional block diagram of a wireless power transmitter 1300, in accordance with an exemplary embodiment. The wireless power transmitter 1300 comprises means 1302, means 1304, and means 1306 for the various actions discussed with respect to FIGS. 1-10D. The wireless power transmitter 1300 includes the means 1302 for sensing at one or more nodes of the wireless power transmitter for wireless power received at a transmit antenna of the wireless power transmitter. In an embodiment, means 1302 for sensing at one or more nodes of the wireless power transmitter for wireless power received at a transmit antenna of the wireless power transmitter may be configured to perform one or more of the functions discussed above with respect to block 1110 of FIG. 11. The wireless power transmitter 1300 further includes means 1304 for generating a monitoring signal based at least on the sensed wireless power received at the transmit antenna. In an embodiment, the means 1304 for generating a monitoring signal based at least on the sensed wireless power received at the transmit antenna may be configured to perform one or more of the functions discussed above with respect to block 1120. The wireless power transmitter 1300 further includes means 1306 for controlling the power level of the driver based at least on the monitoring signal by inhibiting the driver from powering the transmit antenna when the monitoring signal indicates that the transmit antenna is receiving wireless power from a foreign antenna. In an embodiment, the means 1306 for controlling the power level of the driver based at least on the monitoring signal by inhibiting the driver from powering the transmit antenna when the monitoring signal indicates that the transmit antenna is receiving wireless power from a foreign antenna may be configured to perform one or more of the functions discussed above with respect to block 1130.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for generating a wireless field at a power level sufficient to charge one or more electronic devices may be provided by the transmit antenna 710 of FIG. 7; means for powering the wireless field generating means to generate the wireless field may be provided using the driver 706 of FIG. 7; means for sensing wireless power received at the wireless field generating means may be provided by the sensing circuit 716 of FIG. 7; and means for modifying the power level of the powering means based at least on the monitoring signal may be provided by control circuit 718 of FIG. 7.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus to transmit wireless power, the apparatus comprising:
   a transmit antenna configured to generate a wireless field at a power level sufficient to charge one or more electronic devices;
   a driver configured to power the transmit antenna for generation of the wireless field, the power level of the wireless field based at least on a power level of the driver;
   a sensing circuit configured to sense, at one or more nodes, wireless power received at the transmit antenna and further configured to generate a monitoring signal based at least on the sensed wireless power received at the transmit antenna; and
   a control circuit configured to:
      modify the power level of the driver based at least on the monitoring signal, and
      inhibit the driver from initiating powering of the transmit antenna if the monitoring signal indicates that the transmit antenna is receiving wireless power from a foreign antenna.

2. The apparatus of claim 1, wherein the indication that the transmit antenna is receiving wireless power is based on at least one of transmit power, load impedance, or beat pulses sensed at the one or more nodes.

3. The apparatus of claim 1, wherein the control circuit is configured to inhibit the driver from powering the transmit antenna if the monitoring signal indicates that the received wireless power is above a threshold, wherein the threshold has a first value when the transmit antenna is powered and has a second value when the transmit antenna is unpowered, wherein the first and second values are different.

4. The apparatus of claim 1, further comprising:
   a network having an input operatively coupled to the driver and an output operatively coupled to the transmit antenna, the network being at least one of a filter network or a matching network, wherein a corresponding one of the one or more nodes corresponds to the output of the network.

5. The apparatus of claim 1, wherein the driver is configured to maintain operational coupling with the transmit antenna when the monitoring signal indicates that the transmit antenna is receiving wireless power.

6. The apparatus of claim 1, further comprising a blocking circuit configured to block wireless power received by the transmit antenna from propagating through the driver.

7. The apparatus of claim 1, wherein the sensing circuit is configured to perform sensing for at least a duration while the transmit antenna is powered, wherein the control circuit is configured to reduce the power level of the driver if the monitoring signal indicates that the transmit antenna is receiving wireless power from a foreign antenna.

8. The apparatus of claim 7, wherein the control circuit is further configured to reduce the power level of the driver if the monitoring signal indicates that the transmit antenna is wirelessly coupled to another transmit antenna, the another transmit antenna being unpowered.

9. The apparatus of claim 8, wherein the transmit antenna of the apparatus and the another transmit antenna are configured to resonate at the same frequency.

10. The apparatus of claim 7, wherein the control circuit is configured to reduce the power level of the driver by controlling at least one of a bias input, a radio frequency driver input signal, or a clock input.

11. A method of protecting a wireless power transmitter, the method comprising:
sensing at one or more nodes of the wireless power transmitter for wireless power received at a transmit antenna of the wireless power transmitter, the transmit antenna configured to generate a wireless field at a power level sufficient to charge one or more electronic devices, the wireless power transmitter including a driver configured to power the transmit antenna for generation of the wireless field, the power level of the wireless field based at least on a power level of the driver;
generating a monitoring signal based at least on the sensed wireless power received at the transmit antenna; and
modifying the power level of the driver based at least on the monitoring signal; and
inhibiting the driver from powering the transmit antenna if the monitoring signal indicates that the transmit antenna is receiving wireless power above a threshold from a foreign antenna, wherein the threshold has a first value when the transmit antenna is powered and has a second value when the transmit antenna is unpowered, wherein the first and second values are different.

12. The method of claim 11, wherein the indication that the transmit antenna is receiving wireless power is based on at least one of transmit power, load impedance, or beat pulses detected at the one or more nodes.

13. The method of claim 11, wherein sensing at the one or more nodes includes sensing a voltage at an output of a network, wherein the network includes an input operatively coupled to the driver and the output operatively coupled to the transmit antenna, the network being at least one of a filter network or a matching network.

14. The method of claim 11, wherein sensing at the one or more nodes is performed for at least a duration while the transmit antenna is unpowered, and wherein controlling the power level comprises inhibiting the driver from initiating powering the transmit antenna if the monitoring signal indicates that the transmit antenna is receiving wireless power from a foreign antenna.

15. An apparatus for protecting a wireless power transmitter, the apparatus comprising:
means for generating a wireless field at a power level sufficient to charge one or more electronic devices;
means for powering the wireless field generating means to generate the wireless field, the power level of the wireless field based at least on a power level of the powering means;
means for sensing wireless power received at the wireless field generating means, the sensing means further configured to generate a monitoring signal based at least on the sensed wireless power received at the wireless field generating means;
means for modifying the power level of the powering means based at least on the monitoring signal; and
means for inhibiting the powering means from powering the wireless field generating means if the monitoring signal indicates that the wireless field generating means is receiving wireless power above a threshold from a foreign antenna.

16. The apparatus of claim 15, wherein the threshold has a first value when the wireless field generating means is powered and has a second value when the wireless field generating means is unpowered, wherein the first and second values are different.

17. The apparatus of claim 15, wherein the indication that the wireless field generating means is receiving wireless power is based on one or more of transmit power, load impedance, or beat pulse sensed.

* * * * *